US007587228B2

(12) United States Patent
Kim

(10) Patent No.: US 7,587,228 B2
(45) Date of Patent: Sep. 8, 2009

(54) ANTENNA DEVICE FOR PORTABLE TERMINAL

(75) Inventor: Young-Jin Kim, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 616 days.

(21) Appl. No.: 11/343,096

(22) Filed: Jan. 30, 2006

(65) Prior Publication Data

US 2007/0054712 A1 Mar. 8, 2007

(30) Foreign Application Priority Data

Sep. 8, 2005 (KR) ...................... 10-2005-0083568

(51) Int. Cl.
*H04M 1/00* (2006.01)

(52) U.S. Cl. .............. 455/575.7; 455/575.1; 455/575.5; 455/562.1; 455/90.3; 455/575.6; 343/702; 343/876; 343/895

(58) Field of Classification Search .............. 455/575.1, 455/575.7, 575.5, 90.3, 562.1, 575.6; 343/702, 343/876, 895
See application file for complete search history.

(56) References Cited

U.S. PATENT DOCUMENTS 4,994,816 A * 2/1991 Kondo ........................ 343/762
5,587,717 A * 12/1996 Jang ........................... 342/359
5,739,793 A * 4/1998 Adachi ....................... 343/702
6,342,869 B1 * 1/2002 Edvardsson et al. ......... 343/841
6,639,489 B2 * 10/2003 Okuda et al. ................ 333/104
6,792,296 B1 * 9/2004 Van Bosch ............... 455/569.2
6,850,738 B2 * 2/2005 Nokkonen et al. ............ 455/83
6,954,180 B1 * 10/2005 Braun et al. ................ 343/702
7,046,198 B2 * 5/2006 Sakiyama et al. ..... 343/700 MS
7,292,880 B2 * 11/2007 Lehtonen ................. 455/569.1
7,447,171 B2 * 11/2008 Smallcomb et al. ......... 370/316
2003/0214801 A1 11/2003 Wang et al.
2006/0094349 A1 * 5/2006 Slesak et al. ............... 455/3.02
2007/0018895 A1 * 1/2007 Bolin ......................... 343/702

FOREIGN PATENT DOCUMENTS

EP 0 784 353 7/1997
JP 63179669 7/1988
JP 2001036319 2/2001
JP 2001251232 9/2001
WO WO 2004/084427 9/2004

* cited by examiner

*Primary Examiner*—Marceau Milord
(74) *Attorney, Agent, or Firm*—The Farrell Law Firm, LLP

(57) ABSTRACT

An antenna device for a portable terminal, which includes an antenna module disposed in an antenna jack of a terminal capable of TV service, the antenna module receiving broadcasting signals depending on mounting/demounting of an external antenna. The antenna device for a portable terminal includes an antenna module disposed along the outer circumference of the antenna jack, which receives broadcasting signals depending on mounting/demounting of the external antenna; an insulator module; and an antenna switch module. The external antenna provides a broadcast signal to the terminal when connection jack of the external antenna is joined with the antenna jack. The antenna module provides broadcast signals when the connection jack external antenna is separated from the antenna jack.

10 Claims, 6 Drawing Sheets

ANTENNA DEVICE FOR PORTABLE TERMINAL

PRIORITY

This application claims priority to an application entitled "ANTENNA DEVICE FOR PORTABLE TERMINAL" filed in the Korean Industrial Property Office on Sep. 8, 2005 and assigned Serial No. 2005-83568, the contents of which are incorporated by herein reference.

BACKGROUND OF THE INVENTION

1. Field of the Invention

The present invention relates to an antenna device for a portable terminal. Particularly, the present invention relates to an antenna device for a portable terminal, which includes an antenna module disposed in an antenna jack of a terminal capable of TV service where the antenna module receives broadcasting signals depending on mounting/demounting of an external antenna.

2. Description of the Related Art

Recently, portable terminals have become multi-functional and downsized due to demands of consumers. Particularly, such multi-functional terminals provide voice communication service, radio service, and MP3 music download service via Internet. Additionally, it is possible to obtain digital information about various data and images with ease from portable terminals, Personal Digital Assistants (PDAs), computers and notebook computers.

Portable terminals generally include a Liquid Crystal Display (LCD) as data output device. Conventionally, a keypad including a plurality of keys is used for input of data.

In addition to the above, a portable terminal has an antenna device, located at a position with adequate space in its main body, for receiving signals transmitted from a counterpart terminal.

In some cases, a so-called fading phenomenon occurs in portable terminals during a transmission/reception process with a base station. The fading phenomenon is caused when the same signal is received through at least two different paths at different times, such that the received signals are distorted. In order to prevent the above-mentioned problem, a terminal is provided with a diversity antenna device, in addition to a standard antenna device, so that signals received from each antenna are combined to extract optimized signals and to ensure communication quality.

Additionally, it is possible to improve data communication speed of a terminal by using a diversity antenna device.

In one embodiment of a portable terminal, the above-mentioned diversity antenna device is disposed on the exterior of a terminal in the form of a set of a whip antenna and a helical antenna. The external antenna device is mounted with an internal antenna device.

Portable terminals with the above-described structure have spread quickly to consumers and are used widely. Also, there is a tendency to develop multi-functional portable terminals having various functions for satisfying the diverse needs of consumers, in addition to simple communication service. For example, besides voice communication, additional services for users include Video-On-Demand (VOD) service, image communication service, digital camera functions, Internet service, TV service, etc.

A portable terminal capable of TV service among the above additional services is referred to as a digital multimedia-broadcasting (DMB) terminal, which allows a user to watch TV programs through a display device, while also performing a mobile telecommunication function.

The portable terminal capable of TV service includes at least two Radio Frequency (RF) modules, because a frequency band necessary for transception of voices and data is different from a frequency band for broadcasting. Accordingly, the portable terminal capable of TV service is operated in a phone mode, waiting mode, and a broadcasting service mode, which is an image reception mode combined with a waiting mode.

As shown in FIGS. 1-3, the terminal has a diversity antenna device 3 including a broadcasting signal receiving module (not shown). An antenna jack 1*a* is disposed on a printed circuit board 4 embedded in the terminal 1 for interconnecting an external antenna 2 for exclusive use in broadcasting service with the broadcasting signal receiving module. The antenna jack 1*a* and connection jack 2*a* of the external antenna 2 for exclusive use in broadcasting service are joined with each other to receive TV broadcasting signals. Such received signals are applied to a broadcasting signal input module 5 disposed in the terminal.

As described above, signals received from the external antenna for exclusive use in the broadcasting service and from the diversity antenna device are combined to extract optimized signals, thereby preventing the so-called fading phenomenon and improving communication quality. As a result of the distance between the diversity antenna device and the external antenna (for exclusive use in the broadcasting service) increases, it is possible to obtain increasingly improved effects.

However, when a user watches TV using a conventional DMB terminal, it is necessary to use both the external antenna for exclusive use in the broadcasting service and the diversity antenna device. Therefore, it is necessary to provide a separate space in the terminal for mounting the diversity antenna, because a separate diversity antenna is mounted additionally to the terminal after connecting the antenna jack of the terminal with the external antenna for exclusive use of broadcasting service. As a result, it is inevitable that additional terminal space is required, thereby adversely affecting the ability to downsize of the terminal.

Additionally, because it is necessary to mount a separate diversity antenna to the terminal, the cost of antenna production increases and the time needed for assembly of the terminal increases due to the increased number of component elements.

Further, it is necessary for users to carry a conventional antenna for exclusive use of broadcasting service in their hands at all times in order to use it on demand. Therefore, there is a possibility of the loss of the antenna, resulting in degradation of its portability.

SUMMARY OF THE INVENTION

Accordingly, the present invention has been made to solve the above-mentioned problems occurring in the prior art. An object of the present invention is to provide an antenna device for a portable terminal, which includes an antenna module for receiving broadcasting signals mounted on the outer surface of an antenna jack housing of a terminal capable of TV service, so that a space needed for mounting an antenna device for exclusive use of broadcasting service can be reduced and thus the terminal can be downsized.

Another object of the present invention is to provide an antenna device for a portable terminal, which is provided with an antenna module including meander lines on the antenna jack housing of a terminal capable of TV service so that the number of components forming the antenna can be reduced and thus manufacturing costs can be saved.

Still another object of the present invention is to provide an antenna device for a portable terminal, which includes an antenna module disposed in an antenna jack of a terminal capable of TV service, wherein the antenna module receives broadcasting signals depending on mounting/demounting of an external antenna for exclusive use in the broadcasting service, so that users can watch TV with no need of a separate portable external antenna for exclusive use of broadcasting service.

In order to accomplish the above objects, there is provided a portable terminal having an antenna jack connected electrically with an external antenna, the antenna device including an antenna module disposed along the outer circumference of the antenna jack, which receives broadcasting signals depending on mounting/demounting of the external antenna; an insulator module disposed at the bottom of the antenna jack; and an antenna switch module disposed in the antenna jack, which makes an electric contact point with a jack ground point disposed inside the antenna jack, so as to be connected electrically with a contact point of a signal input module disposed in the terminal when the external antenna is joined with the antenna jack, and which causes the electric contact point to be separated from the jack ground point while making another electric contact point with an antenna ground point of the antenna module, so as to be connected electrically with the contact point of the signal input module when the external antenna is separated from the antenna jack.

BRIEF DESCRIPTION OF. THE DRAWINGS

The above and other objects, features and advantages of the present invention will be more apparent from the following detailed description taken in conjunction with the accompanying drawings, in which.

Figure 7:
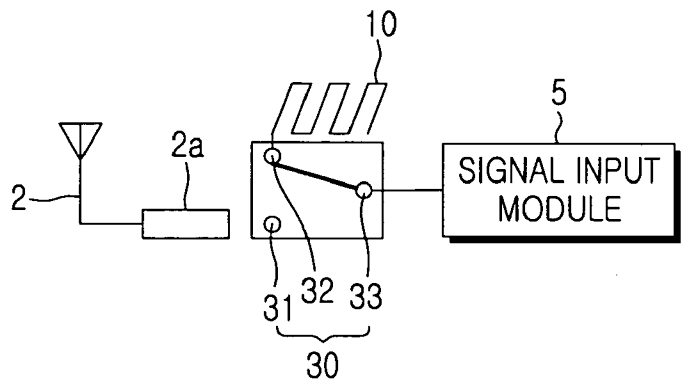
Figure 8:
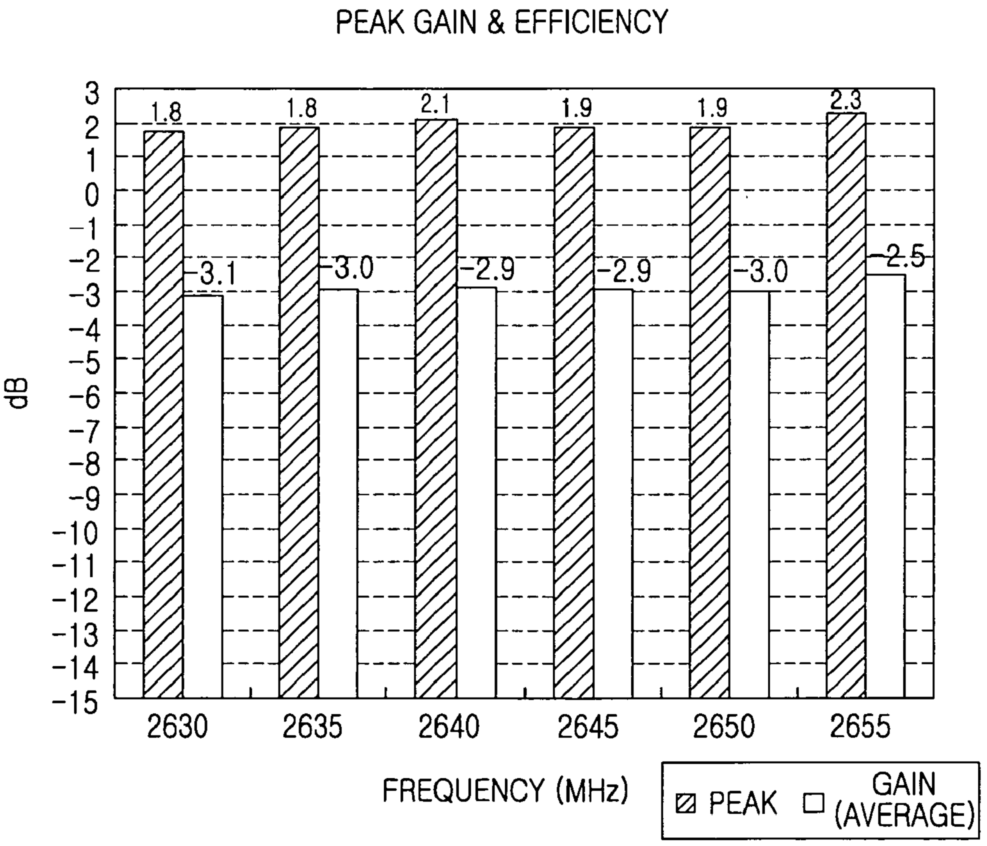

FIG. 7 is a schematic view showing how to electrically connect an antenna module with an antenna jack in the antenna device for a portable terminal according to a preferred embodiment of the present invention; and FIG. 8 is a graph showing antenna gain and efficiency as a function of frequency in the antenna device for a portable terminal according to a preferred embodiment of the present invention.

DETAILED DESCRIPTION OF THE PREFERRED EMBODIMENT

Hereinafter, preferred embodiments of the present invention will be described with reference to the accompanying drawings.

Figure 1:
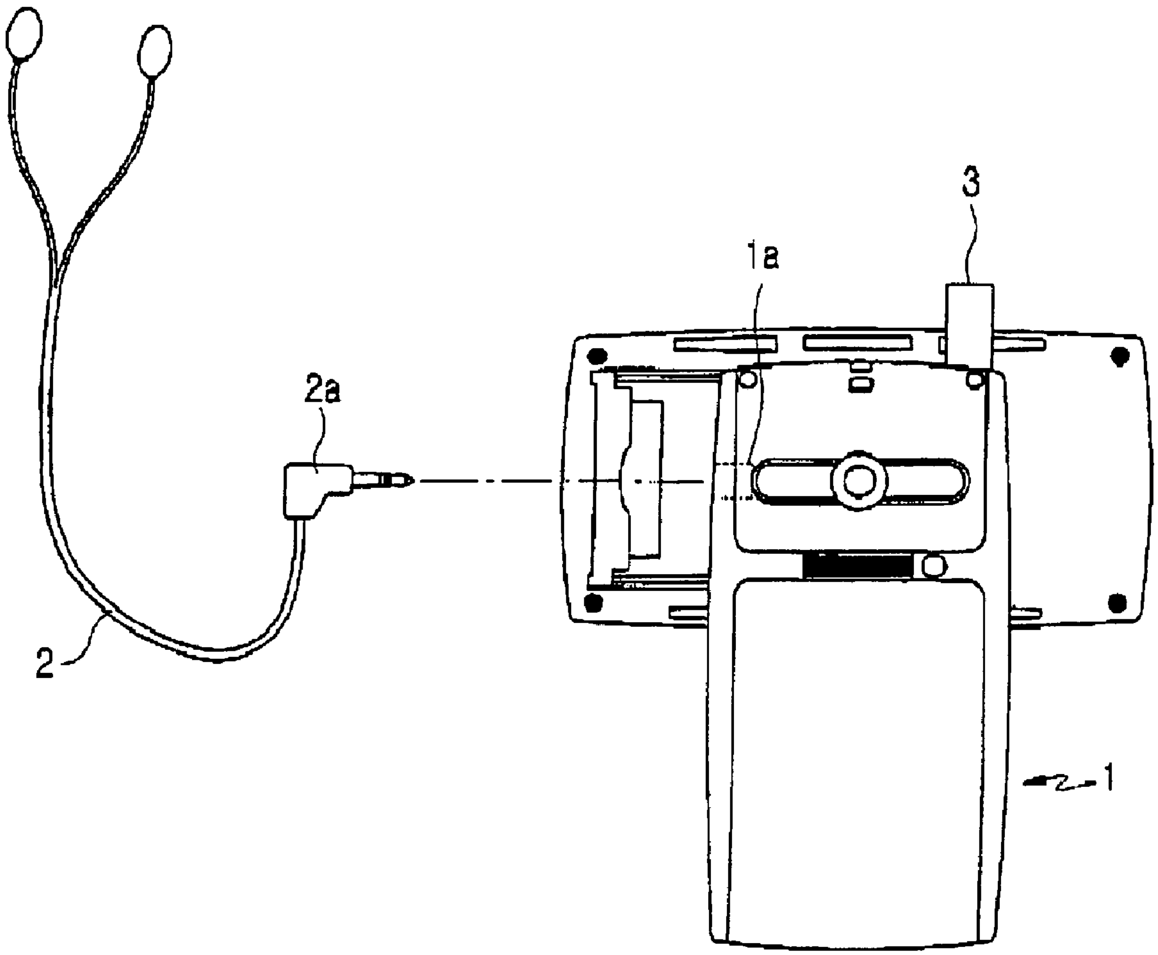
FIG. 1 (PRIOR ART)
FIG. 1 is a portable terminal having an external antenna for exclusive use in a broadcasting service connected thereto according to the prior art.
Figure 2:
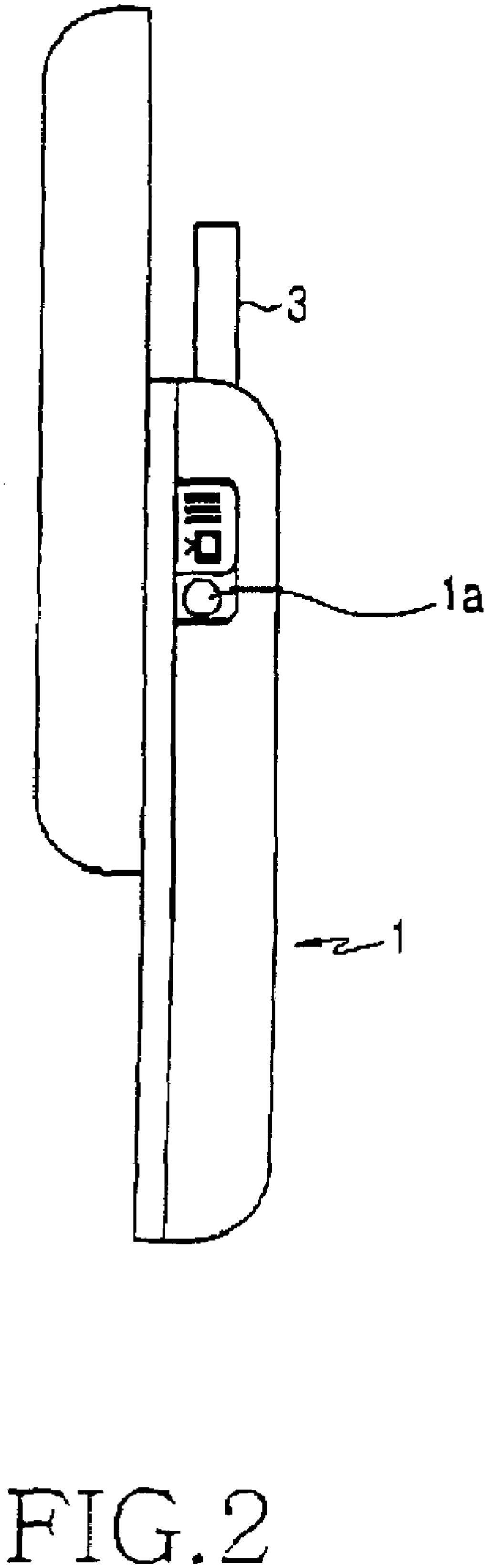
FIG.2 (PRIOR ART)
FIG. 2 is a side view showing an antenna jack disposed in a portable terminal according to the prior art.
Figure 3:
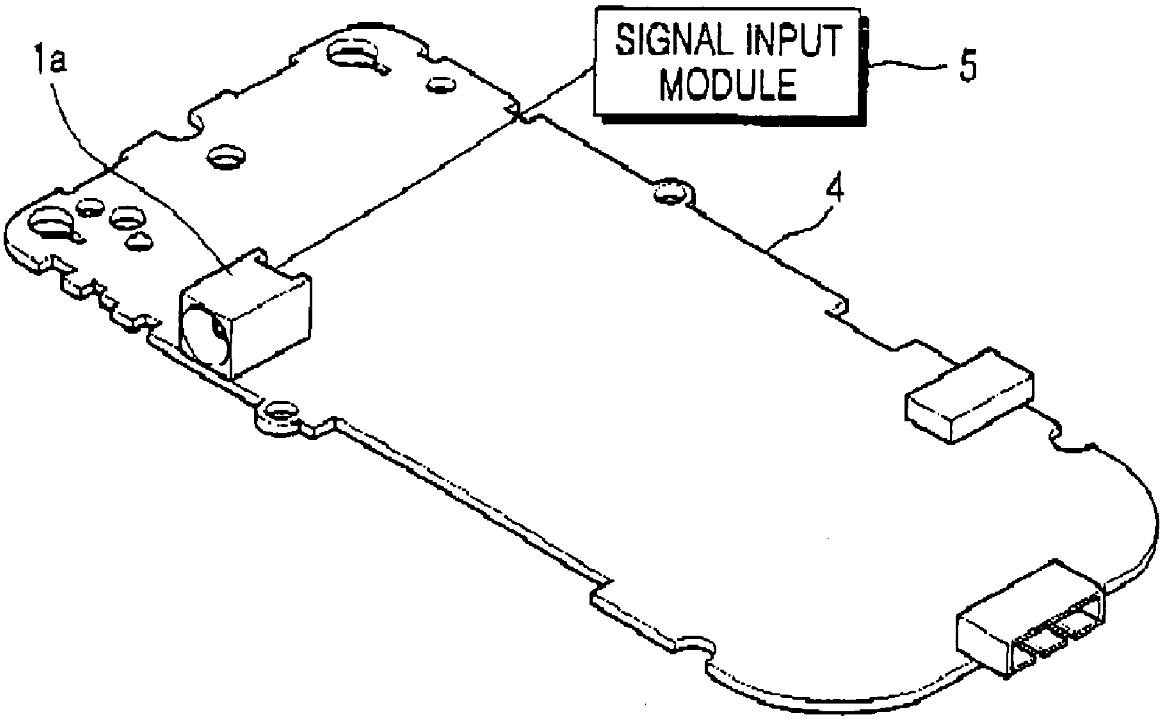
FIG.3 (PRIOR ART)
FIG. 3 is a perspective view showing an antenna jack, mounted to a printed circuit board embedded in a portable terminal, according to the prior art.
Figure 4:
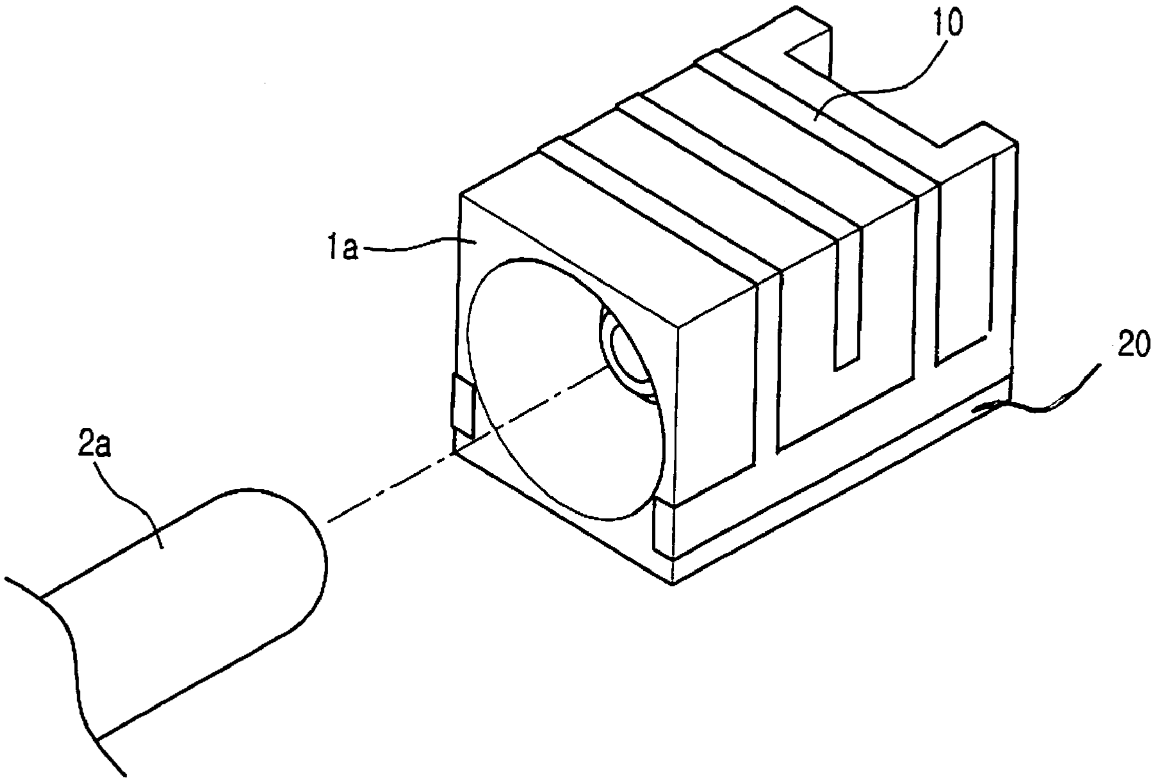
FIG. 4 is a perspective view showing an antenna device for a portable terminal according to a preferred embodiment of the present invention.

As shown in FIG. 4, an antenna device for a portable terminal includes an antenna module 10, an insulator module 20 and an antenna switch module 30 (not shown), wherein the antenna module 10 is disposed along the outer circumference of an antenna jack 1*a*, so as to receive broadcasting signals depending on mounting/demounting of an external antenna 2 for exclusive use in the broadcasting service. The insulator module 20 is disposed at the bottom of the antenna jack 1*a*, so as to insulate the antenna module 10.

Figure 6:
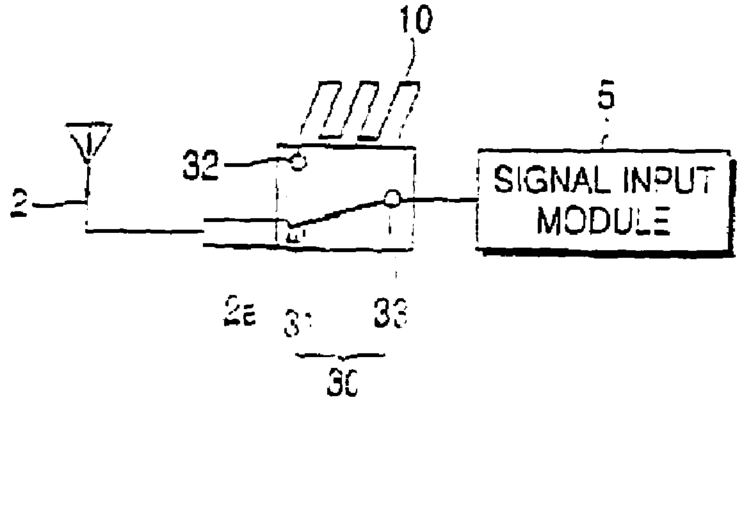
FIG. 6 is a schematic view showing how to electrically connect an external antenna, for exclusive use in a broadcasting service, with an antenna jack in the antenna device for a portable terminal according to a preferred embodiment of the present invention.

As shown in FIGS. 6 and 7, the antenna switch module 30 is disposed in the antenna jack 1*a*. On one hand (see FIG. 6), when the external antenna 2 is joined with the antenna jack 1*a*, the antenna switch module 30 makes an electric contact point with a jack ground point 31 disposed inside the antenna jack 1*a*, so as to be connected electrically with a contact point 33 of a signal input module disposed in the terminal 1. Thus the signals received by the external antenna 2 are applied to the terminal 1. On the other hand (see FIG. 7), when the external antenna 2 is separated from the antenna jack 1*a*, the antenna switch module 30 causes the electric contact point with the jack ground point to be separated from the jack ground point 31 while making another electric contact point with an antenna ground point 32 of the antenna module 10, so as to be connected electrically with the contact point 33 of the signal input module 5. Thus the signals received by the antenna module 10 are applied to the terminal 1 through the signal input module 5.

Figure 5:
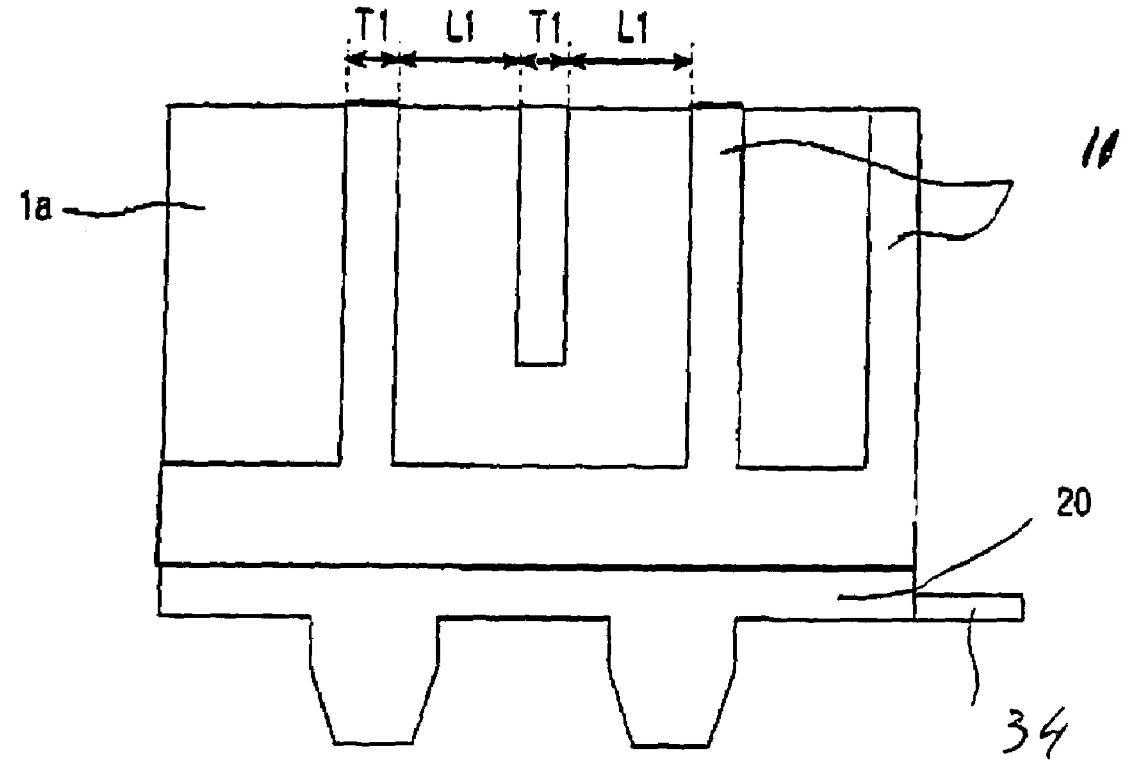
FIG. 5 is a side view showing the arrangement of the antenna device for a portable terminal according to a preferred embodiment of the present invention.

Additionally, as shown in FIG. 5, the antenna module 10 includes a diversity antenna 34 and has at least one meander line 11. Further as shown in FIG. 5, the meander lines 11 have a constant thickness and are spaced apart from each other at a constant interval. More particularly, the meander lines have a thickness T1 of 0.6 mm and are spaced apart from each other at an interval L1 of 1.2 mm.

As shown in FIGS. 6 and 7, the antenna switch module 30 includes a jack ground point 31 and an antenna ground point 32. The jack ground point 31 is disposed in the antenna jack 1*a* in such a manner that it can make electric contact with a connection jack 2*a* of the external antenna for exclusive use in a broadcasting service, when the connection jack 2*a* is joined with the antenna jack 1*a*. Additionally, the antenna ground point 32 is disposed in the antenna jack 1*a* in such a manner that it can be separated from the jack ground point 31 while another electric contact point with the antenna module 10 is made, when the antenna jack 1*a* is separated from the connection jack 2*a*.

Hereinafter, operation of the above-described antenna device for a portable terminal according to a preferred embodiment of the present invention will be explained in more detail with reference to FIGS. 4-8.

As shown in FIG. 4, the antenna device 10 for a portable terminal 1 includes the antenna jack 1*a* connected electrically with the external antenna for exclusive use in a broadcasting service, the antenna module 10, insulator module 20, and the antenna switch module 30. The antenna module 10 is disposed along the outer circumference of the antenna jack 1*a* and the insulator module 20 is disposed at the bottom of the antenna module 10.

As shown in FIGS. 6 and 7, when the external antenna 2, which is used exclusively in the broadcasting service, is joined with the antenna jack 1*a*, the jack ground point 31 disposed in the antenna switch module 30 makes electric contact point with the external antenna, and thus is connected electrically with the contact point 33 of the signal input module 5 disposed in the terminal 1. On the other hand when the external antenna 2, which is used exclusively for broadcasting service is separated from the antenna jack 1*a*, the electric contact point is separated from the jack ground point 31. Another electric contact point with the antenna ground point 32 of the antenna module 10 is made, so as to be connected electrically with the contact point 33 of the signal input module 5.

Under the above conditions, the antenna module 10 is mounted to the printed circuit board 4 of the terminal 1.

As shown in FIG. 5, the antenna module 10 includes a diversity antenna 34 and has at least one meander line 11. More particularly, the meander lines 11 have a thickness T1 of 0.6 mm and are spaced apart from each other at an interval L1 of 1.2 mm.

Then (as shown in FIG. 6) when the connection jack 2*a* of the external antenna 2, which is used exclusively in the broadcasting service, is joined with the antenna jack 1*a*, the connection jack 2*a* of the external antenna 2 makes an electric contact point with the jack ground point 31 of the antenna switch module 30. At the same time, the jack ground point 31 makes an electric contact with the contact point 33 of the signal input module 5. Accordingly, broadcasting signals received by the external antenna 2, which is used exclusively in the broadcasting service, are applied to the terminal 1, so that users can watch TV through the terminal 1.

On the other hand, when the connection jack 2*a* of the external antenna 2, is separated from the antenna jack 1*a*, the electric contact point with the jack ground point is separated from the jack ground point 31 of the antenna switch module 30. At the same time, another electric contact point with the antenna ground point 32 of the antenna module 10 is made, so as to be connected electrically with the contact point 33 of the signal input module 5. Accordingly, broadcasting signals received by the antenna module 10 are applied to the terminal, so that users can watch TV through the terminal 1.

As described above, the antenna module 10 then serves as an antenna for exclusive use of broadcasting service by making an electric contact with the contact point 33 of the signal input module, when the external antenna 2, which is used exclusively for broadcasting service, is separated.

FIG. 8 and the following Table 1 show the results of antenna gain and efficiency depending on frequencies, when the antenna module 10 serves as an antenna for exclusive use in the broadcasting service.

TABLE 1

| Frequency | Peak | Gain (Average) | (expressed in dBi units) Efficiency (%) |
|---|---|---|---|
| 2630 MHz | 1.8 | −3.1 | 49% |
| 2635 MHz | 1.8 | −3.0 | 51% |
| 2640 MHz | 2.1 | −2.9 | 51% |
| 2645 MHz | 1.9 | −2.9 | 51% |
| 2650 MHz | 1.9 | −3.0 | 50% |
| 2655 MHz | 2.3 | −2.5 | 56% |

As shown in Table 1 and FIG. 8, when the antenna module 10 is used as the antenna for exclusive use in the broadcasting service with variable frequencies, the average value of antenna gain is −2.9 dBi and antenna efficiency is 51%.

Therefore, the antenna module 10 shows stable antenna gain and efficiency when being used as antenna for exclusive use in the broadcasting service.

As described above, because the antenna device for a portable terminal according to the present invention includes an antenna module receiving broadcasting signals on the outer surface of an antenna jack housing of a terminal capable of TV service, it is possible to downsize the terminal by reducing the space needed for mounting an antenna device, which is used exclusively for broadcasting service. Additionally, because the antenna module includes meander lines, it is possible to reduce the number of components forming the antenna and thus to save manufacturing costs.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An antenna device for a portable terminal, the antenna device comprising:

an antenna jack for electrical connection to a separable external antenna, the antenna jack having an antenna module disposed on an outer circumference of the antenna jack;

a signal input module; and an antenna switch module disposed in the antenna jack, the antenna switch module electrically connecting the external antenna to the signal input module and disconnecting the antenna module from the signal input module when the external antenna is connected to the antenna jack, the antenna switch module electrically connecting the antenna module to the signal input module and disconnecting the external antenna from the signal input module when the external antenna is separated from the antenna jack.

2. An antenna device for a portable terminal as claimed in claim 1, wherein the antenna module includes a diversity antenna.

3. An antenna device for a portable terminal as claimed in claim 1, wherein the antenna module includes at least one meander line.

4. An antenna device for a portable terminal as claimed in claim 3, wherein the meander lines have a constant thickness and are separated apart from each other at a constant interval.

5. An antenna device for a portable terminal as claimed in claim 4, wherein the meander lines have a thickness of 0.6 mm.

6. An antenna device for a portable terminal as claimed in claim 4, wherein the meander lines are separated apart from each other at an interval of 1.2 mm.

7. An antenna device for a portable terminal as claimed in claim 1, wherein the antenna module includes:

a jack ground point disposed in the antenna jack so as to be connected electrically with a connection jack of the external antenna when the external antenna is connected to the antenna jack; and an antenna ground point that makes an electric contact point with the signal input module when the external antenna is separated from the antenna jack.

8. An antenna device for a portable terminal as claimed in claim 1, wherein a connection jack of the external antenna makes an electric contact point with a jack ground point disposed inside the antenna jack when the connection jack of the external antenna is joined with the antenna jack while the jack ground point is connected electrically with a contact point of the signal input signal module, so that broadcasting signals received by the external antenna are applied to the terminal; and the electric contact point with the jack ground point is separated from the jack ground point when the connection jack of the external antenna is separated from the antenna jack while another electric contact point with the antenna ground point of the antenna module is made to be connected electrically with the contact point of the signal input module, so that broadcasting signals received by the antenna module are applied to the terminal.

9. An antenna device for a portable terminal as claimed in claim 1, wherein the external antenna and the antenna module include an antenna for exclusive use in a broadcasting service.

10. An antenna device for a portable terminal, the antenna device comprising:

an antenna jack for electrical connection to a separable external antenna, the antenna jack having an antenna module disposed along an outer circumference of the antenna jack; and an antenna switch module disposed in the antenna jack, the antenna switch module electrically disconnecting the antenna module from and connecting the external antenna to the portable terminal to provide the portable terminal with signals received by the external antenna when the external antenna is connected to the antenna lack, the antenna switch module electrically disconnecting the external antenna from and connecting the antenna module to the portable terminal to provide the portable terminal with signals received by the antenna module when the external antenna is separated from the antenna jack.

* * * * *

UNITED STATES PATENT AND TRADEMARK OFFICE

CERTIFICATE OF CORRECTION

PATENT NO. : 7,587,228 B2
APPLICATION NO. : 11/343096
DATED : September 8, 2009
INVENTOR(S) : Young-Jin Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 837 days.

Signed and Sealed this

Twenty-first Day of September, 2010

David J. Kappos

*Director of the United States Patent and Trademark Office*